United States Patent [19]

Fujisawa

[11] 4,441,109

[45] Apr. 3, 1984

[54] PEN TYPE RECORDING DEVICE

[75] Inventor: Kyuichi Fujisawa, Tonan, Japan

[73] Assignee: Alps Electric Co., Ltd., Tokyo, Japan

[21] Appl. No.: 348,145

[22] Filed: Feb. 11, 1982

[30] Foreign Application Priority Data

Feb. 17, 1981 [JP] Japan .............................. 56-20090[U]

[51] Int. Cl.³ .......................... G01D 15/16; B41J 29/26

[52] U.S. Cl. .................................... 346/139 R; 400/18

[58] Field of Search .................. 346/136, 139; 400/17, 400/18

[56] References Cited

U.S. PATENT DOCUMENTS

| | | | |
|---|---|---|---|
| 2,348,923 | 5/1944 | Perricone | 346/139 R |
| 2,711,810 | 6/1955 | Greenspan | 400/18 |
| 4,121,224 | 10/1978 | Takeuchi et al. | 346/139 C |
| 4,259,025 | 3/1981 | Jamieson | 400/18 |

*Primary Examiner*—Donald A. Griffin

*Attorney, Agent, or Firm*—Guy W. Shoup; Gerard F. Dunne

[57] ABSTRACT

Disclosed is a pen type recording device for performing recording by relative movements of pen means and recording paper in the state where the tip end of a pen is brought into contact with the recording paper, which comprises a pen holding member for holding the pen in such a manner that the pen can project toward the recording paper, and a rotary lift member rotatably supported on the pen holding member to lift up the rear side of the pen held on the pen holding member by the rotation thereof.

In this pen type recording device, the operation of exchanging pen is greatly facilitated, and movement of pen holding means across a recording paper can be performed very smoothly.

15 Claims, 4 Drawing Figures

PEN TYPE RECORDING DEVICE

BACKGROUND OF THE INVENTION

The present invention relates to a pen type recording device for use in an X-Y plotter, an alphanumeric printer or the like. More particularly, the present invention relates to an improvement of a pen holding mechanism in such pen type recording devices.

Description of the Prior Art

A pen holding mechanism of a conventional recording device of this type is illustrated in FIG. 1. This pen holding mechanism is mounted on a carriage (not shown) of the recording device. A rotary lever 2 is rotatably supported at the center thereof on a supporting shaft 1 attached to the carriage (not shown). A pen holder 3 and a supporting arm 5 are attached to the top end of the rotary lever 2, and a pen 4 is fixed to the pen holder 3 by a screw or other appropriate means. One end of a coil spring 7 is anchored on the supporting arm 5 and the other end of the coil spring 7 is anchored on the carriage, and this coil spring 7 always pulls the supporting arm 5 in a direction indicated by arrow A to impart a rotating force in the clockwise direction in the drawings to the rotary lever 2. A driving lever 6 attached to the lower end of the rotary lever 2 is driven by an appropriate drive source, for example, an electromagnet mounted on the carriage.

In the above-mentioned structure, when the drive lever 6 is pulled in a direction indicated by arrow B by an appropriate drive source, the rotary lever 2 is rotated in the counterclockwise direction in the drawings with the supporting shaft 1 being the center, and the pen holder 3 is pushed out in a direction indicated by arrow C to press the pen 4 to the paper surface. If the carriage is delivered in the direction X-Y in this state, desirable recording data can be printed and recorded on the paper surface. Retraction of the pen 4 is accomplished by releasing the pulling force imposed on the driving lever 6 in the direction indicated by arrow B and retracting the pen holder 3 by the action of the coil spring 7.

The conventional pen type recording device comprising a pen holding mechanism having the above-mentioned structure is defective in that many members are necessary for holding the pen 4, and assembling these members is complicated and troublesome, and furthermore, the operation of exchanging pens 4 is complicated.

SUMMARY OF THE INVENTION

It is, therefore, a primary object of the present invention to provide a pen type recording device in which the foregoing defects of the conventional devices are eliminated and the operation of exchanging pens is greatly facilitated.

Another object of the present invention is to provide a pen type recording device in which delivery of means holding a pen across a recording paper can be performed very smoothly.

More specifically, in accordance with the present invention, there is provided a pen type recording device for performing recording by relative movements of means holding a pen and recording paper in the state where the tip end of the pen is brought into contact with the recording paper, which comprises a pen holding member for holding the pen in such a manner that the pen can project toward the recording paper, and a rotary lift member rotatably supported on the pen holding member to lift up the rear side of the pen held on the pen holding member by the rotation thereof.

DETAILED DESCRIPTION OF THE PREFERRED EMBODIMENT

Figure 3:
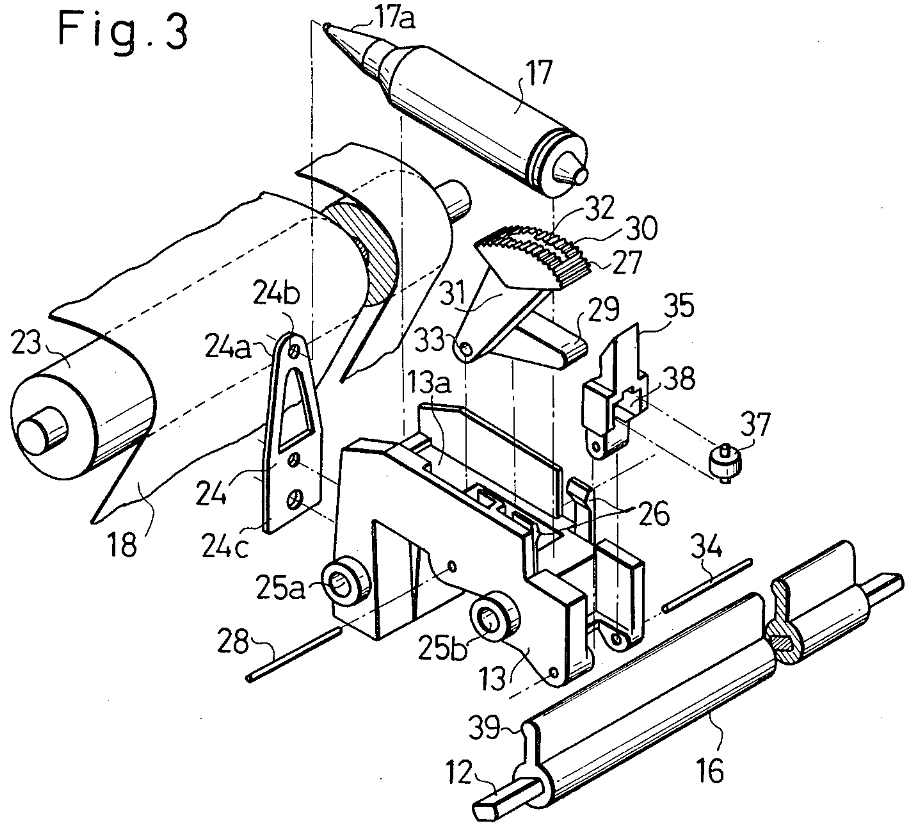
FIGS. 3 and 4 are fragmentary perspective and sectional views showing a pen holding mechanism in the recording device shown in FIG. 2.
Figure 4:
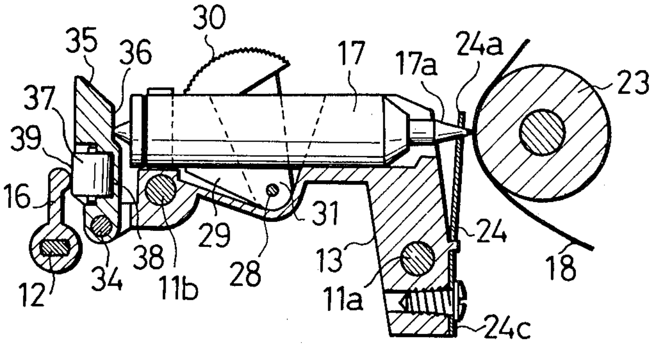

The present invention will now be described in detail with reference to an embodiment illustrated in FIGS. 2 through 4 of the accompanying drawings.

Figure 1:
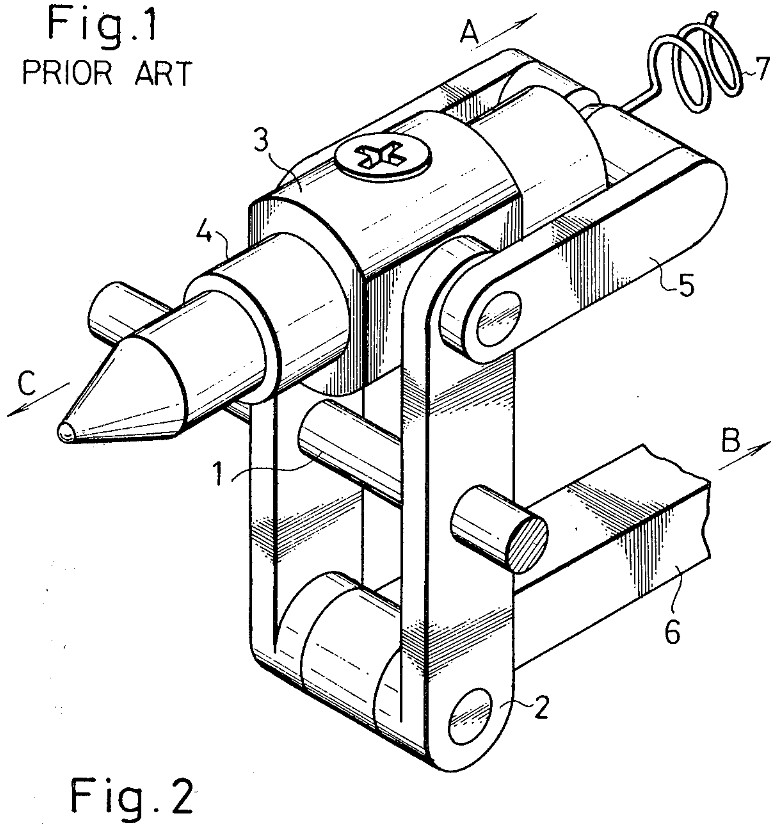
Fig.1 PRIOR ART
FIG. 1 is a perspective view illustrating a pen holding mechanism in a conventional pen type recording device.
Figure 2:
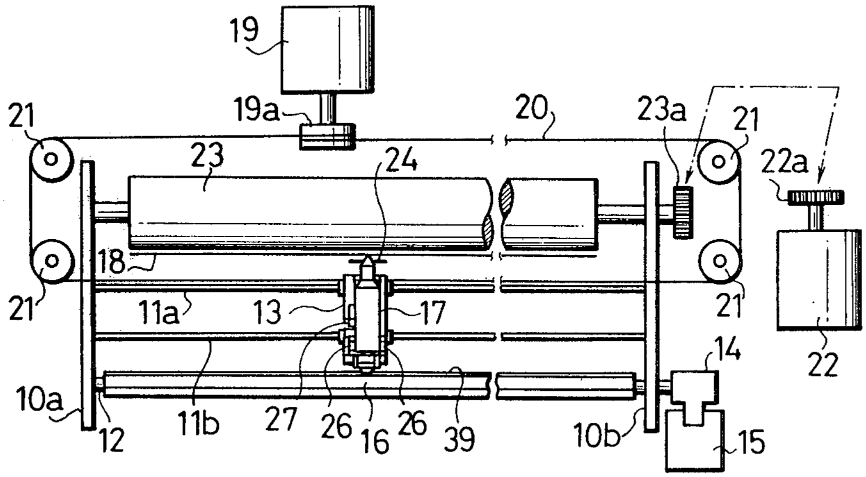
FIG. 2 is a schematic view illustrating diagrammatically the structure of one embodiment of the pen type recording device according to the present invention.

Referring to FIG. 2, side frames **10*a* and 10*b* constituting a part of a framework of the pen type recording device are vertically arranged in parallel to each other, and two guide shafts 11*a* and 11*b* extend between the side frames 10*a* and 10*b*. A pen holding member 13 formed of a synthetic resin is slidably inserted between the two guide shafts 11*a* and 11*b*. A hammer shaft 12 extends between the side frames 10*a* and 10*b* in parallel to the guide shafts 11*a* and 11*b*. This hammer shaft 12 can freely rotate by a predetermined quantity. A lever 14 attached to an end portion of the hammer shaft 12 is connected to, for example, a movable portion of a self-retention type solenoid 15 stabilized in two ways, and by controlling activation of the solenoid 15, the hammer shaft 12 is caused to rotate. The section of the hammer shaft 12 has an oval shape, and a hammer member 16 extending along the entire region of movement of the pen holding member 13 is spline-coupled with the hammer shaft 12**.

A pen 17 is contained in a slide groove **13*a* of the pen holding member 13, and a very light and small pen, for example, a short refill on an oily or aqueous ink type ball-point pen, is used as the pen 17. A conical portion 17*a* is formed at the tip end of the pen 17 and is fitted in a circular hole 24*b* formed on a free end 24*a* of a plate spring 24 described hereinafter, so that the pen 17 is always pressed toward the hammer member 16 by the plate spring 24. The tip end of the pen 17 confronts a platen 23 through a recording paper 18**.

A pulse motor 19 is provided to move the pen holding member 13 transversely across the recording paper 18, and a rope 20 (thread-like member) wound on a drive pulley **19*a* of the pulse motor 19 is connected to the pen holding member 13 through guide pulleys 21 so that the pen holding member 13 can be moved in the axial direction of the guide shaft 11 through rotation of the pulley 19*a* engaging the rope 20** forming a closed loop.

A pulse motor 22 is disposed to move the recording paper 18 in a direction orthogonal to the direction of movement of the pen holding member 13. The pulse motor 22 is connected to a paper feed platen 23 through gears **22*a* and 23*a*, and the recording paper 18 is moved in a direction orthogonal to the direction of movement of the pen holding member 13 by forward or reverse rotation of the pulse motor 22**.

A base 24*c* of the plate spring 24 is fixed to the front face of the pen holder 13 by screws, snap fitting or other appropriate means. A circular hole 24*b* formed on a fee end 24*a* of the plate spring 24 is fitted in the conical portion 17*a* of the pen 17 by the resiliency of the plate spring 24 per se to hold the tip end portion of the pen 17 assuredly, and project the ball element in the tip end of the pen 17 toward the recording paper 18.

Two through holes 25*a* and 25*b* are formed in the lower portion of the pen holding member 13 for insertion of the guide shafts 11*a* and 11*b*, and a slide groove 13*a* is formed in the upper portion of the pen holding member 13 to slidably contain the pen 17 therein. Resilient pieces 26 confronting each other are arranged on respective sides of the slide groove 13*a* in the rear portion thereof to hold the pen 17 in the slide groove 13*a*.

A lever-like lift member 27 formed of a synthetic resin is rotatably supported in the vicinity of the slide groove 13*a* in front of the resilient pieces 26 by a pin 28 inserted from the side face of the pen holding member 13. This lift member 27 comprises a lift-up piece 29, an operation portion 30 and a connecting portion 31 connecting the lift-up piece 29 and the operation portion 30 to each other. This lift-up piece 29 is contained in a concave portion formed on the bottom of the slide groove 13*a* and in the normal state, the lift-up piece 29 is located on substantially the same level as the bottom of the slide groove 13*a*. The operation portion 30 projects above the pen holding member 13, and the top face of the operation portion 30 is knurled with an arrow 32 indicating the proper rotation direction for easy operation by pressing with an operator's finger. A hole 33 is formed in the lower part of the connecting portion 31 for receiving the pin 28. When the operation portion 30 is pushed in the direction of the arrow 32, the lift mmeber 27 rotated with the pin 28 being the center, and the lift-up piece 29 rises up from the concave portion of the slide groove 13*a* to lift the rear end of the pen 17 upwardly. By this operation, the rear end of pen 17 is projected upwards from the pen holding member 13, and the pen 17 can easily be taken out from the pen holding member 13 and plate spring 24.

A push-out member 35 is rotatably supported on the rear end of the pen holding member 13 by means of a pin 34. The front of the upper portion of the push-out member has a forward face 36 adapted to be brought into abutting contact with rear end of the pen 17, and a concave portion 38 for rotatably receiving a roller 37 therein is formed on the rear of the upper portion of the push-out member 35. The roller 37 is contained and supported in the concave portion 38 so that a part of the periphery of roller 37 projects toward the hammer member 10, and the roller 37 is brought in contact with a projection 39 formed on the front face of the hammer member 16.

In the state where the hammer member 16 (hammer shaft 12) is not rotated, the pen 17 is pressed toward the hammer member 16 by resiliency of the plate spring 24, and the tip portion of the pen 17 is separated by a predetermined distance from the recording paper 18.

If the pulse motor 19 is rotated in the above-mentioned state, the pen holding member 13 is moved along the guide shaft 11 across the surface of the recording paper 18 through the rope 20. At this time, also the push-out member 35 is moved together with the pen holding member 12, and with this movement, the roller 37 rolls along the projection 39 formed on the front face of the hammer member 16. When the pen holding member 13 (pen 17) has been moved to a desirable position relative to the recording paper 18, the solenoid 15 is energized to rotate the hammer member 16 by a predetermined quantity toward the platen 23 through the lever 14 and hammer shaft 12, and the push-out member 35 is pushed by the projection 39 of the hammer member 16 and rotated in the same direction with the pin 34 being the center to push out the pen 17 towards the recording paper 18. In the state where the tip end of the pen 17 is thus kept in contact with the recording paper, the pen holding member 13 and/or the recording paper 18 can be moved to draw a desirable figure or pattern on the recording paper 18. Namely, optional recording data such as figures, letters or patterns can be recorded on the recording paper 18 by appropriately controlling the pulse motors 19 and 22, and the solenoid 15.

As will be apparent from the foregoing description, the pen type recording device of the present invention is characterized in that the recording device comprises a pen holding member for holding a pen in such a manner that the pen can project toward a recording paper, and a rotary lift member is provided for lifting up the rear end of the pen held on the pen holding member by the rotation operation thereof. By virtue of this characteristic feature, according to the present invention, the structure of the recording device is simplified and the operation of exchanging pens is greatly facilitated.

As pointed out hereinbefore, in the present invention, since a push-out member provided with a roller having a rolling contact with the pressing face of the hammer member is interposed between the hammer member and the pen, movement of the pen holding member is accomplished while the roller is in rolling contact with the hammer member and the hindrance of resistance to this delivery operation is drastically diminished.

Ordinarily, when the pen holding member is delivered in the state where the rear end of the pen is directly brought into contact with the hammer member, because of the sliding resistance between the pen and hammer member, it sometimes is impossible to move the pen to the predetermined position within a preset time, and precise recording becomes difficult. Furthermore, if the push-out member to be delivered integrally with the pen holding member is spline-coupled with a hammer shaft having a non-circular section, for example, an oval section, the frictional resistance to sliding is remarkably increased, and the accumulated error of the delivery quantity is increased to such an extent that it cannot be neglected. Furthermore, the size of the drive source for delivering the pen holding member is inevitably increased.

On the other hand, according to the present invention, since delivery of the pen is performed while the roller is brought into rolling contact with the hammer member, the delivery operation can be performed very smoothly and precise recording can be accomplished. Therefore, a pen type recording device having a high recording reliability can be provided according to the present invention.

Moreover, in the present invention, since the concial portion of the pen point is engaged with a hole formed on a plate spring to hold the top end of the pen by this plate spring and simultaneously space resiliently the pen from a recording paper by this plate spring, and since the rear end of the pen is snap-fitted by an resilient piece, the structure of the pen holding mechanism can be simplified and the pen can be held assuredly. Only by lifting up the rear end of the pin, the pen is caused to bend the plate spring and the plate spring is thus caused to push the pen rearwardly by the resilient force thereof, whereby removal of the pen can be remarkably facilitated.

What is claimed is:

1. A pen type recording device for performing recording by relative movements of pen means and recording paper in the state where the tip end of the pen means is brought into contact with the recording paper, comprising a pen holding member for holding the pen means in such a manner that the pen means can project toward the recording paper, and a rotary lift member rotatably supported on said pen holding member to lift up the rear side of the pen means held on said pen holding member by the rotation thereof.

2. A pen type recording device as set forth in claim 1, further comprising (a) a pair of hook-shaped resilient pieces formed integrally with said pen holding member to hold said pen means by snap-fitting, (b) a lift-up piece of said rotary lift member being brought into abutting contact with the back face of the pen means hold on said pen holding member, and (c) an operation portion of said rotary lift member being projected to the upper portion of said pen holding member, wherein by rotating said operation end, sad lift-up piece is caused to raise the rear end of said pen means against the resilient elastic force of said elastic pieces.

3. A pen type recording device as set forth in claim 1, wherein spring means is disposed to resiliently press said pen means in a direction away from the recording paper.

4. A pen type recording device for performing recording by relative movements of pen means and recording paper in the state where the tip end of the pen means is brought into contact with the recording paper, comprising a pen holding member for holding the pen means in such a manner that the pen means can project toward the recording paper, a pair of resilient pieces formed integrally with said pen holding member to hold said pen means by snap-fitting, a conical portion formed on the tip end of said pen means, a plate spring having a base end thereof fixed to said pen means and a through hole formed on a free end thereof, said conical portion of the pen means being fitted in said through hole of said plate spring to resiliently press the pen means in a direction away from the recording paper, a writing portion formed on the tipmost end of said pen means to project toward the recording paper from said through hole, and a rotary lift member rotatably supported on said pen holding member to lift up the rear side of the pen means held on said pen holding member by the rotation thereof.

5. A pen type recording device for performing recording by relative movements of pen means and recording paper in the state where the tip end of the pen means is brought into contact with the recording paper, comprising (a) a pen holding member for holding the pen means in such a manner that the pen means can project toward the recording paper, (b) pen holding member delivery means for moving said pen holding member across the surface of the recording paper, (c) paper delivery means for delivering the recording paper in a direction intersecting the direction of movement of said pen holding member at a right angle, (d) a hammer member rotatable in a predetermined direction, extending along the entire region of movement of the pen holding member, and (e) a push-out member moving together with said pen holding member and having a roller having rolling contact with the pressing face of said hammer member, a part of said push-out member being brought into abutting contact with said pen means and said push-out member being rotated by the pressing force of said hammer member to push out said pen means toward the recording paper.

6. In a recording device having a pen held by a holder for relative movement against a recording paper, the improvement wherein said holder includes means for raising the rear portion of said pen from said holder to facilitate removal of said pen, said raising means including a member carried pivotally by said holder and having a lift-up portion adapted to underlie a rear portion of said pen and an operation portion extending upwardly from said holder so that said operation portion may be urged by an operator in a direction pivoting said member to raise said lift-up portion to lift the rear portion of said pen.

7. A recording device according to claim 6, said holder carrying at its forward portion means including a spring adapted to engage the forward portion of said pen for urging said pen rearwardly away from said recording paper.

8. A recording device according to claim 7, said holder including a longitudinal groove adapted to receive said pen, and having means including resilient arms upstanding from a rear portion of said groove for holding the rear portion of said pen within said groove.

9. A recording device according to claim 8, said raising means including a member carried pivotally by said holder and having a lift-up portion adapted to underlie a rear portion of said pen and an operation portion extending upwardly from said holder so that said operation portion may be urged by an operator in a direction pivoting said member to raise said lift-up portion and free the rear portion of said pen from said arms.

10. A recording member according to claim 9, said operation portion having a knurled upper surface having a smoother portion depicting an arrow pointing in the direction for actuation by said operator.

11. A recording device according to claim 8, said spring being a plate spring secured to a forward portion of said holder and having a hole receiving the forward portion of said pen.

12. A recording device according to claim 7, said spring being a plate spring secured to a forward portion of said holder and having a hole receiving the forward portion of said pen.

13. A recording device having a pen held by a holder for relative movement against a recording paper, said holder having a longitudinal groove adapted to receive said pen, a spring secured to the forward portion of said holder and adapted to engage the forward portion of said pen for urging said pen rearwardly, and means including resilient arms upstanding from a rear portion of said groove for releasably holding the rear portion of said pen within said groove.

14. A recording device according to claim 13, said spring being a plate spring having an opening adapted to receive the forward portion of said pen.

15. In a recording device for forming images on a recording paper, including a pen held by a holder adapted to be moved transversely across said paper while said paper may be fed in the orthogonal direction, and means for selectively moving said pen forwardly of said holder to press it against said paper for drawing images by relative movement of said holder and said paper, the improvement wherein said moving means includes a hammer member extending longitudinally along the path of movement of said holder, means including a pushout member carried pivotally by said holder and engaging the rear portion of said pen for urging said pen forwardly upon pivotal movement thereof in a predetermined direction, said push-out member carrying a roller held in contact with said hammer member during movement of said holder whereby said hammer member may be turned to pivot said push-out member and urge said pen forwardly at any position of said holder along its path of movement.

* * * * *